United States Patent
Yoshikawa et al.

(10) Patent No.: US 11,410,683 B2
(45) Date of Patent: Aug. 9, 2022

(54) ELECTRONIC DEVICE, MOBILE TERMINAL, COMMUNICATION SYSTEM, MONITORING METHOD, AND PROGRAM

(71) Applicant: KYOCERA Corporation, Kyoto (JP)

(72) Inventors: Joji Yoshikawa, Sagamihara (JP); Yuki Yamada, Yokohama (JP); Hiroshi Okamoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 115 days.

(21) Appl. No.: 16/643,781

(22) PCT Filed: Sep. 3, 2018

(86) PCT No.: PCT/JP2018/032586
§ 371 (c)(1),
(2) Date: Mar. 2, 2020

(87) PCT Pub. No.: WO2019/049821
PCT Pub. Date: Mar. 14, 2019

(65) Prior Publication Data
US 2020/0202888 A1 Jun. 25, 2020

(30) Foreign Application Priority Data
Sep. 5, 2017 (JP) .............................. JP2017-170638

(51) Int. Cl.
*G10L 25/63* (2013.01)
*G10L 15/18* (2013.01)
*G10L 15/22* (2006.01)
*G06V 40/16* (2022.01)
*G10L 15/08* (2006.01)

(52) U.S. Cl.
CPC ............. *G10L 25/63* (2013.01); *G06V 40/174* (2022.01); *G10L 15/1815* (2013.01); *G10L 15/22* (2013.01); *G10L 2015/088* (2013.01); *G10L 2015/227* (2013.01); *G10L 2015/228* (2013.01)

(58) Field of Classification Search
CPC ..... G10L 15/00; G10L 15/1815; G10L 15/22; G10L 2015/088; G10L 2015/227; G10L 2015/228; G10L 25/00; G10L 25/63; G06K 9/00; G06K 9/00302
See application file for complete search history.

(56) References Cited

U.S. PATENT DOCUMENTS

| | | |
|---|---|---|
| 8,892,424 B2 | 11/2014 | Harada et al. |
| 9,099,088 B2 | 8/2015 | Washio et al. |
| 10,489,451 B2 | 11/2019 | Fujita et al. |
| 2008/0167868 A1* | 7/2008 | Kanevsky ............... G10L 15/24 704/233 |

(Continued)

FOREIGN PATENT DOCUMENTS

| | | | |
|---|---|---|---|
| CN | 204425391 U | * | 6/2015 |
| JP | 2005283647 A | * | 10/2005 |

(Continued)

*Primary Examiner* — Daniel C Washburn
*Assistant Examiner* — Sean E Serraguard
(74) *Attorney, Agent, or Firm* — Studebaker & Brackett PC

(57) ABSTRACT

An electronic device includes a controller. The controller performs a voice recognition operation on a voice uttered by a person being monitored. The controller generates emotion information for the person being monitored, based on the voice recognition operation.

18 Claims, 9 Drawing Sheets

(56) References Cited

U.S. PATENT DOCUMENTS

| | | | |
|---|---|---|---|
| 2009/0018832 A1* | 1/2009 | Mukaigaito | G10L 15/26 704/251 |
| 2009/0210220 A1* | 8/2009 | Mitsuyoshi | G10L 25/90 704/207 |
| 2011/0282666 A1 | 11/2011 | Washio et al. | |
| 2013/0080169 A1 | 3/2013 | Harada et al. | |
| 2016/0070245 A1* | 3/2016 | Lee | A61B 5/0004 700/49 |
| 2016/0171100 A1 | 6/2016 | Fujita et al. | |
| 2017/0046496 A1* | 2/2017 | Johnstone | G06F 16/2228 |
| 2017/0270922 A1* | 9/2017 | Fu | G10L 17/06 |
| 2017/0346947 A1* | 11/2017 | Ling | H04M 3/4936 |

FOREIGN PATENT DOCUMENTS

| | | | |
|---|---|---|---|
| JP | 2005283647 A | 10/2005 | |
| JP | 2006178063 A | 7/2006 | |
| JP | 2011242755 A | 12/2011 | |
| JP | 2013072979 A | 4/2013 | |
| JP | 2015109040 A | 6/2015 | |
| JP | 2015142221 A | 8/2015 | |
| JP | 2015184597 A | 10/2015 | |
| WO | 2015037073 A1 | 3/2015 | |

* cited by examiner

ELECTRONIC DEVICE, MOBILE TERMINAL, COMMUNICATION SYSTEM, MONITORING METHOD, AND PROGRAM

CROSS REFERENCE TO RELATED APPLICATION

This application claims priority to and the benefit of Japanese Patent Application No. 2017-170638 filed on Sep. 5, 2017, the entire contents of which are incorporated herein by reference.

TECHNICAL FIELD

The present disclosure relates to an electronic device, a mobile terminal, a communication system, a monitoring method, and a program.

BACKGROUND

Mobile terminals such as smartphones, tablet PCs, and laptop computers are in widespread use. Mobile terminals configured to report the behavior of a person being monitored, such as a child, to a supervising person based on a movement history or a purchase history of the person being monitored are proposed.

SUMMARY

An electronic device according to a first aspect of the present disclosure includes:

a controller capable of performing a voice recognition operation on a voice uttered by a person being monitored and a monitoring operation for generating emotion information for the person being monitored based on the voice recognition operation.

A mobile terminal according to a second aspect of the present disclosure includes:

a communication interface configured to acquire emotion information from an electronic device that includes a controller capable of performing a voice recognition operation on a voice uttered by a person being monitored and a monitoring operation for generating emotion information for the person being monitored based on the voice recognition operation; and a display configured to display an image based on the emotion information.

A communication system according to a third aspect of the present disclosure includes;

a mobile terminal; and an electronic device that includes a controller that is capable of performing a voice recognition operation on a voice uttered by a person being monitored and a monitoring operation for generating emotion information for the person being monitored based on the voice recognition operation and, is configured to cause the communication interface to transmit the emotion information to the mobile terminal.

It should be understood that, although the apparatuses and the system have been mainly described above, embodiments that include a method, a program, or a memory storing the program that substantially correspond to the apparatuses and the system can also realize the present disclosure and thus are also included in the scope of the disclosure.

A monitoring method according to a fourth aspect of the present disclosure includes:

a step of performing a voice recognition operation on a voice uttered by a person being monitored; and a step of performing a monitoring operation to generate emotion information for the person being monitored based on the voice recognition operation.

A program according to a fifth aspect of the present disclosure is a program for causing an electronic device to perform a voice recognition operation on a voice uttered by a person being monitored and a monitoring operation for generating emotion information for the person being monitored based on the voice recognition operation.

DETAILED DESCRIPTION

Hereinafter, an embodiment of the present disclosure will be described with reference to the accompanying drawings.

Figure 1:
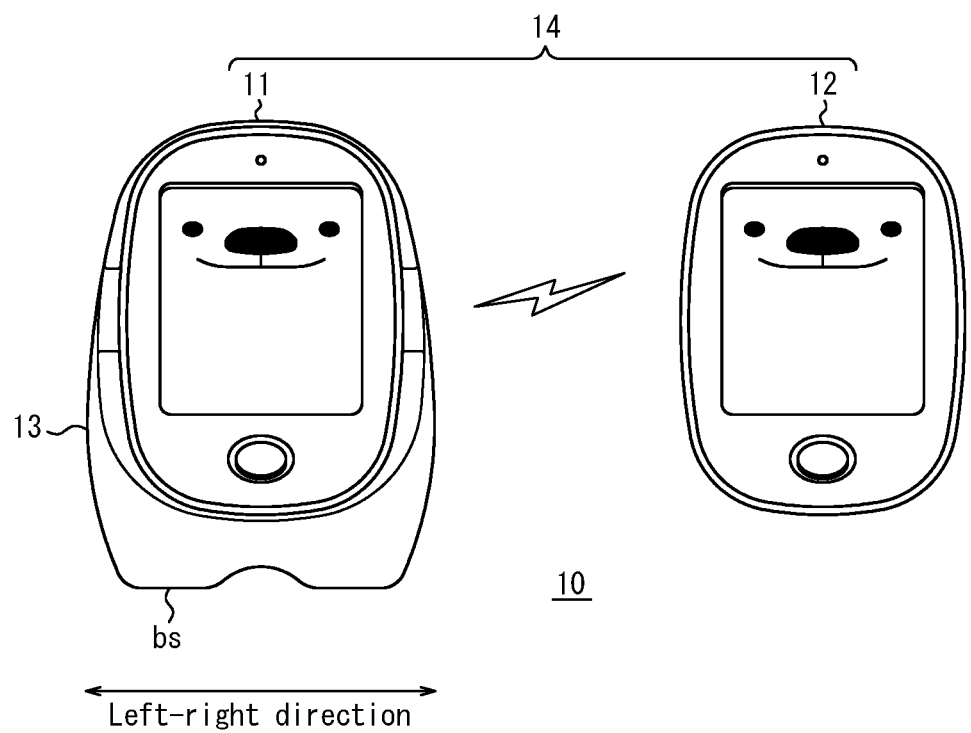
FIG. 1 is an elevation view illustrating an exterior of a communication system that includes an electronic device according to an embodiment.

A communication system 10 of the present disclosure that includes an electronic device 14, includes a first electronic device 11, a second electronic device 12, and a charging stand 13, as illustrated in FIG. 1. Hereinafter, unless otherwise distinguished, the first electronic device 11 and the second electronic device 12 are collectively referred to as an electronic device 14. The first electronic device 11 is an electronic device 14 of a guardian. The second electronic device 12 is an electronic device 14 of a person being monitored.

Figure 2:
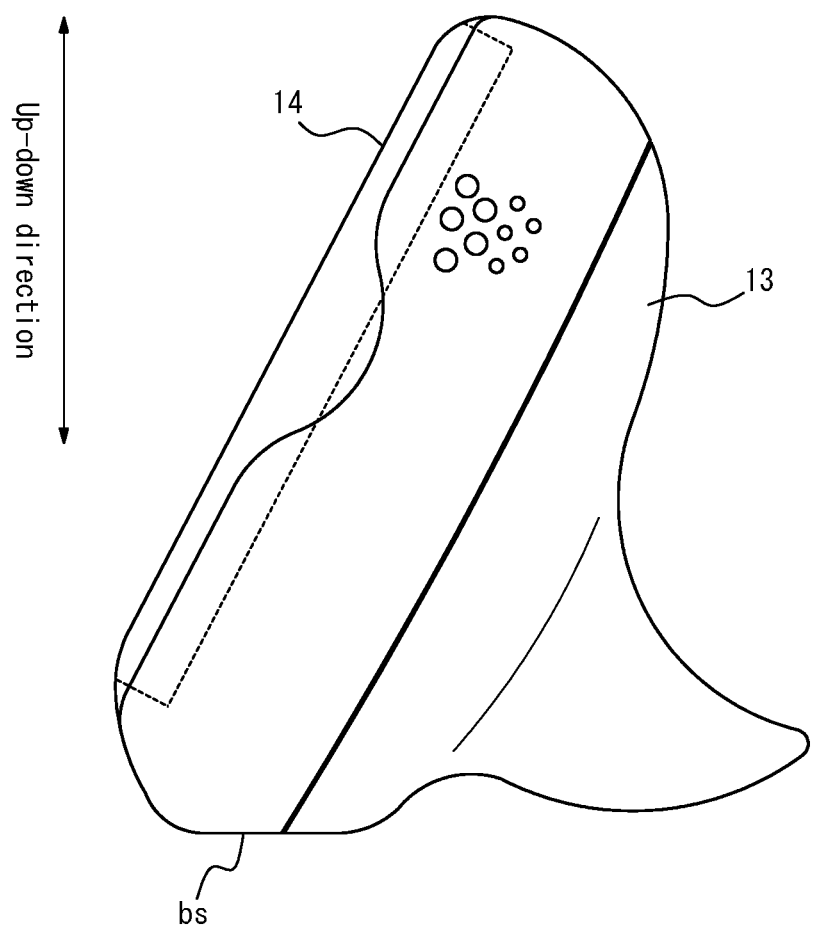
FIG. 2 is a side view of a charging stand having the electronic device of FIG. 1 mounted thereon.

When the electronic device 14 is mounted on the charging stand 13, the charging stand 13 charges an internal battery of the electronic device 14, as illustrated in FIG. 2. Also, while the electronic device 14 is mounted on the charging stand 13, the communication system 10 can interact with a user.

Figure 3:
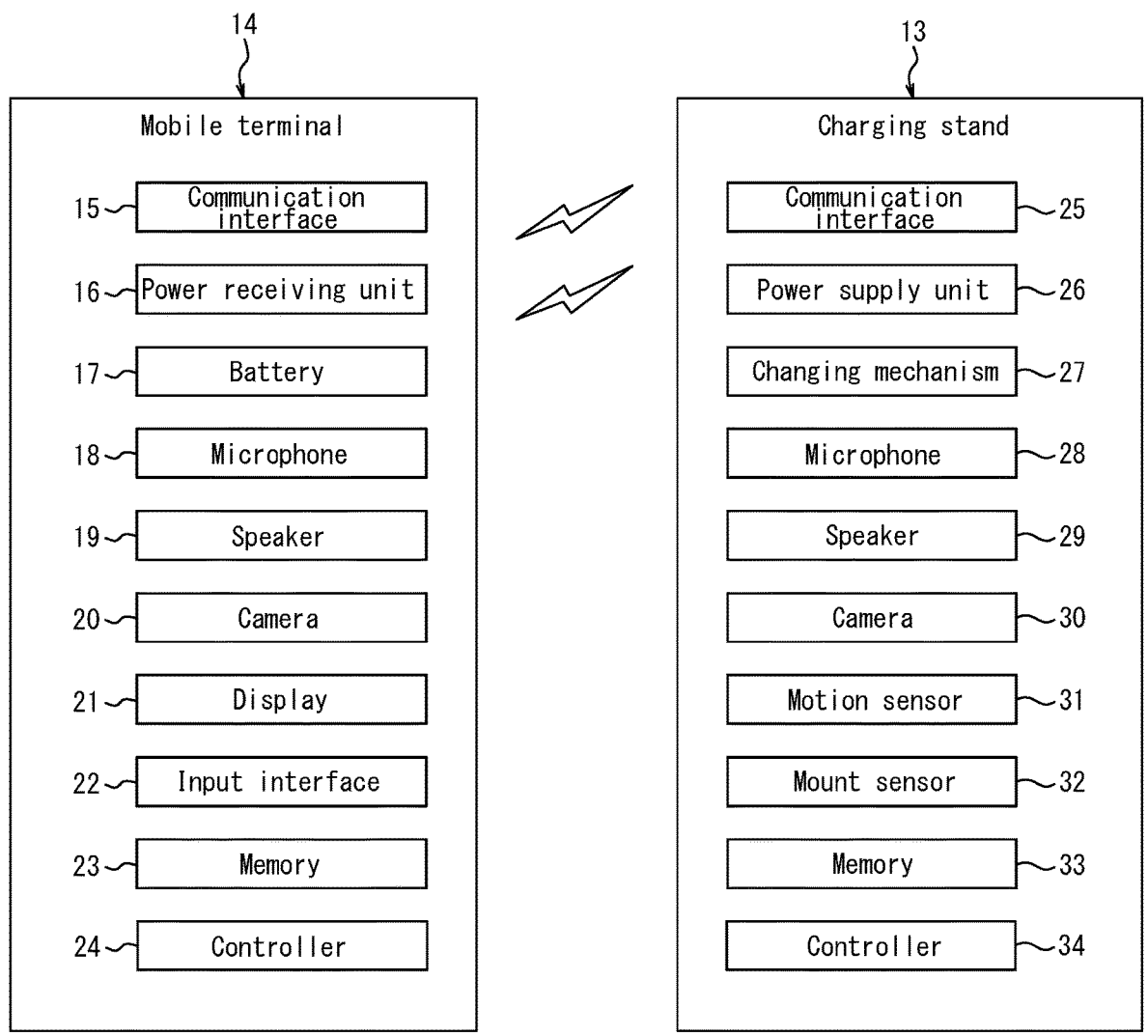
FIG. 3 is a functional block diagram schematically illustrating internal configurations of the electronic device and the charging stand of FIG. 1.

The electronic device 14 is, for example, a mobile terminal, as illustrated in FIG. 3. The electronic device 14 includes a communication interface 15, a power receiving unit 16, a battery 17, a microphone 18, a speaker 19, a camera 20, a display 21, an input interface 22, a memory 23, and a controller 24.

The communication interface 15 includes a communication interface capable of performing communication using voice, characters, or images. As used in the present disclosure, "communication interface" may encompass, for example, a physical connector, a wireless communication device, or the like. The physical connector may include an electrical connector which supports transmission of electrical signals, an optical connector which supports transmission of optical signals, or an electromagnetic connector which supports transmission of electromagnetic waves. The electrical connector may include connectors compliant with IEC60603, connectors compliant with the USB standard, connectors compatible with an RCA pin connector, connectors compatible with an S terminal as defined in EIAJ CP-1211A, connectors compatible with a D terminal as defined in EIAJ RC-5237, connectors compliant with HDMI® (HDMI is a registered trademark in Japan, other countries, or both), connectors compatible with coaxial cable including BNC (British Naval Connectors), Baby-series N Connectors, or the like. The optical connector may include a variety of connectors compliant with IEC 61754. The wireless communication device may include devices conforming to various standards such as Bluetooth® (Bluetooth is a registered trademark in Japan, other countries, or both) or IEEE 802.11. The wireless communication device includes at least one antenna.

The communication interface 15 communicates with an external device that is external to the electronic device 14, such as, for example, the charging stand 13. In other words, the communication interface 15 of the first electronic device 11, the communication interface 15 of the second electronic device 12, and a communication interface 25 of the charging stand 13 communicate with one another. The communication interface 15 communicates with an external device by performing wired or wireless communication. In a configuration in which the communication interface 15 performs wired communication with the charging stand 13, the communication interface 15 is connected to and can communicate with the communication interface 25 of the charging stand 13 when the electronic device 14 is mounted on the charging stand 13 in an appropriate orientation and position. The communication interface 15 may communicate with the external device in a direct manner using wireless communication or in an indirect manner using, for example, a base station and the Internet or a telephone line.

The power receiving unit 16 receives electric power supplied from the charging stand 13. The power receiving unit 16 includes, for example, a connector for receiving electric power from the charging stand 13 via wires. Alternatively, the power receiving unit 16 includes, for example, a coil for receiving electric power from the charging stand 13 using a wireless feeding method such as an electromagnetic induction method or a magnetic field resonance method. The power receiving unit 16 charges the battery 17 with the received electric power.

The battery 17 stores electric power supplied from the power receiving unit 16. The battery 17 discharges electric power and thus supplies the electric power necessary for the constituent elements of the electronic device 14 to execute the respective functions.

The microphone 18 detects a voice originating from the vicinity of the electronic device 14 and converts the voice into an electrical signal. The microphone 18 outputs the detected voice to the controller 24.

The speaker 19 outputs a voice based on control by the controller 24. For example, when the speaker 19 performs a speech function, which will be described below, the speaker 19 outputs speech determined by the controller 24. For example, when the speaker 19 performs a call function with another electronic device, the speaker 19 outputs a voice acquired from the other electronic device.

The camera 20 captures an image of a subject located in an imaging range. The camera 20 can capture both still images and a video. When capturing video, the camera 20 successively captures images of a subject at a speed of, for example, 60 fps. The camera 20 outputs the captured images to the controller 24.

The display 21 is, for example, a liquid crystal display (LCD), an organic EL (Electroluminescent) display, or an inorganic EL display. The display 21 displays an image based on control by the controller 24.

The input interface 22 is, for example, a touch panel integrated with the display 21. The input interface 22 detects various requests or information associated with the electronic device 14 input by the user. The input interface 22 outputs a detected input to the controller 24.

The memory 23 may be configured as, for example, a semiconductor memory, a magnetic memory, an optical memory, or the like. The memory 23 stores, for example, various information necessary for the execution of a registration operation, a speech operation, a voice recognition operation, an observation operation, a monitoring operation, a data communication operation, a telephone call operation, and the like, which will be described later.

The controller 24 includes one or more processors. The controller 24 may include one or more memories for storing programs and information being calculated for use in various operations. The memory includes a volatile memory or a nonvolatile memory. The memory includes a memory independent of the processor or a memory built-in to the processor. The processor includes a general purpose processor configured to read a specific program and perform a specific function, or a specialized processor dedicated for specific processing. The specialized processor includes an application specific integrated circuit (ASIC). The processor includes a programmable logic device (PLD). The PLD includes a field-programmable gate array (FPGA). The controller 24 may be configured as system on a chip (SoC) or a system in a package (SiP), in which one or more processers cooperate.

For example, when the controller 24 receives an instruction from the charging stand 13 to transition to a communication mode as will be described later, the controller 24 controls each constituent element of the electronic device 14 to execute various functions of the communication mode. The communication mode is a mode of the electronic device 14 and the charging stand 13 which causes execution of an interaction with a specific user, observation of the specific user, sending of a message to the specific user, generation of emotion information for a person being monitored, and the like.

The controller 24 performs a registration operation for registering a user which executes the communication mode. For example, the controller 24 starts the registration operation upon detection of an input that requires user registration and is made in respect of the input interface 22.

For example, in the registration operation, the controller 24 issues a message instructing the user to look at a lens of the camera 20, and then captures an image of the user's face by activating the camera 20. Further, the controller 24 stores the captured image in association with user information including the name and attributes of the user. The attributes include, for example, the name of the owner of the electronic device 14, the relation of the user to the owner, gender, age bracket, height, weight, and the like. The controller 24 acquires the user information input to the input interface 22 by the user.

In the registration operation, the controller 24 can store monitoring information in association with the captured image and the user information. The monitoring information includes an identifier indicating whether the registered person is a person being monitored, a telephone number of the electronic device associated with the person being monitored, and the like. The electronic device associated with the person being monitored is an electronic device that includes the controller 24 other than the electronic device 14 and is the second electronic device 12 owned by the person being monitored or the first electronic device 11 owned by a guardian. The controller 24 can acquire respective monitoring information for a plurality of users and store the respective monitoring information in association with respective captured images and user information.

The controller 24 acquires the monitoring information input by a user using the input interface 22. When acquiring the monitoring information, the controller 24 displays an image or the like questioning whether to register on the display 21 and, when the input interface 22 detects an input to authorize registration by the guardian, stores the monitoring information in association with the captured image and user information in the memory 23.

In the registration operation, the controller 24 transfers a registered image together with the user information associated therewith to the charging stand 13. When the controller 24 acquires the monitoring information, the controller 24 transfers the registered image together with the user information and the monitoring information associated with the registered image.

To perform the transfer, the controller 24 determines whether the controller 24 can communicate with the charging stand 13. In a case in which the controller 24 cannot communicate with the charging stand 13, the controller 24 displays a message on the display 21 requesting that communication be enabled. For example, when the electronic device 14 and the charging stand 13 are not connected to each other in a configuration in which the electronic device 14 and the charging stand 13 perform wired communication, the controller 24 displays a message on the display 21 requesting connection. In a case in which the electronic device 14 and the charging stand 13 are located remote from each other and cannot communicate with each other in a configuration in which the electronic device 14 and the charging stand 13 perform wireless communication, the controller 24 displays a message on the display 21 requesting that the electronic device 14 approach the charging stand 13.

When the electronic device 14 and the charging stand 13 can communicate with each other, the controller 24 causes the electronic device 14 to transfer the registered image and the user information to the charging stand 13 and display an indication on the display 21 indicating that the transfer is in progress. When the controller 24 acquires a transfer completion notification from the charging stand 13, the controller 24 causes the display 21 to display a message indicating that the initial setting has been completed.

During transition to the communication mode, the controller 24 causes the electronic device 14 to interact with a specific user by performing at least one of the speech operation and the voice recognition operation.

In the speech operation, the controller 24 determines the content of a speech based on current time, installation location of the charging stand 13, a user targeted for interaction specified by the charging stand 13, an e-mail or a phone call received by the electronic device 14, a note or a schedule registered to the electronic device 14, a voice of the user, and the content of a past speech of the user. Note that the user targeted for interaction specified by the charging stand 13 will be described later. The controller 24 activates the speaker 19 to verbally output the determined content.

In the voice recognition operation, the controller 24 recognizes the content spoken by the user by performing morphological analysis of a voice detected by the microphone 18. The controller 24 performs a predetermined operation based on the recognized content. The predetermined operation may include, for example, a speech operation on the recognized content as described above, a search for desired information, display of a desired image, or making a phone call or sending an email to an intended addressee.

Further, in the voice recognition operation, the controller 24 measures at least one of a quality of the voice detected by the microphone 18, the character of the recognized content of the speech, an extent to which inappropriate words such as "fool" and "idiot" are included in the speech, a volume and vocabulary of the speech, and a response speed. The quality of the voice detected by the microphone 18 includes, for example, a tone and a volume of the voice. The character of the content of the speech is the degree to which positive or negative words are included in the content. The character of the content of a speech is, for example, the extent to which positive words such as "win", "fun", "happy", "thank you", etc. or negative words such as "lose", "boring", "sad", "sorry", etc., are included in the content.

During transition to the communication mode, the controller 24 stores the continuously performed speech operation and the voice recognition operation described above in the memory 23 and learns the content of conversations associated with the specific user targeted for interaction. The controller 24 utilizes the learned content of the conversations to determine subsequent speech. The controller 24 may transfer the learned content of conversations to the charging stand 13.

Also, during transition to the communication mode, the controller 24 learns the lifestyle of the specific user targeted for interaction from the content of conversations made to the user and images captured by the camera 20 during speech by the user. The controller 24 informs the user of advice based on the learned lifestyle of the user. Advice may be provided as speech via the speaker 19 or images displayed on the display 21. Such advice may include, for example, notification of a time to take a medicine, suggestion of a meal that matches the preference of the user, suggestion of a healthy diet for the user, suggestion of an effective exercise the user can continue, or the like.

Further, during transition to the communication mode, the controller 24 detects the current location of the electronic device 14. Detection of the current location is based on, for example, an installation location of a base station in communication with the electronic device 14 or the GPS incorporated in the electronic device 14. The controller 24 notifies the user of local information associated with the detected current location. The notification of the local information may be generated as speech by the speaker 19 or an image displayed on the display 21. The local information may include, for example, sale information for a neighborhood store.

When the input interface 22 detects a request for starting the observation operation associated with a specific target during transition to the communication mode, the controller 24 notifies the charging stand 13 of the request. The specific target may be, for example, a specific registered user, a room in which the charging stand 13 is located, or the like.

The monitoring operation is performed by the charging stand 13, regardless of whether the electronic device 14 is mounted thereon. When the controller 24 receives a notification from the charging stand 13 indicating that the specific target is in an abnormal state, the controller 24 notifies the user to that effect. The notification may be output to the user as voice via the speaker 19 or a warning image displayed on the display 21.

During transition to the communication mode, the controller 24 performs the monitoring operation for monitoring a person being monitored. In the monitoring operation, the controller 24 generates emotion information for the person being monitored, based on an interaction with the person being monitored. In a case in which the electronic device 14 configured to perform the monitoring operation is the first electronic device 11, the controller 24 starts performing the monitoring operation in response to a verbal instruction, detected by the microphone 18, issued by the guardian. The controller 24 ends the monitoring operation in response to a verbal instruction, detected by the microphone 18, issued by the guardian. In a case in which the electronic device 14 configured to perform the monitoring operation is the second electronic device 12, the controller 24 performs the monitoring operation while the second electronic device 12 is mounted on the charging stand 13.

In the monitoring operation, the controller 24 generates the emotion information for the person being monitored, based on at least one of the quality of the voice of the person being monitored, the character of the recognized content of the speech, the volume and the vocabulary of the speech, and the response speed, which are measured in the voice recognition operation. The controller 24 may further use the expression of the person being monitored captured by the camera 20 to generate the emotion information for the person being monitored.

In order to generate the emotion information, the controller 24 accumulates, in the memory 23, at least one of the quality of the voice of the person being monitored, the character of the recognized content of the speech, the volume and the vocabulary of the speech, and the response speed of each, for each registered monitoring target person. The controller 24 calculates at least a mean value of at least one of the accumulated items for each of the registered monitoring target people. The controller 24 generates the emotion information by comparing the mean value of at least one of the quality of the voice of the person being monitored, the character of the recognized content of the speech, the volume and vocabulary of the speech, and the response speed accumulated in the memory 23 for each of the registered monitoring target people.

The controller 24 generates, for example, graduated energy levels and emotion levels as the emotion information. In the present embodiment, the controller 24 generates an energy level and an emotion level as the emotion information.

The controller 24 generates the emotion information for, for example, each successive conversation. In particular, the controller 24 generates the emotion information by calculating the energy level and the emotion level for each of the current day's events, a Shiritori word game, and a chat about an animation program.

The controller 24 regularly or periodically generates a comprehensive evaluation based on the emotion information. The comprehensive evaluation is, for example, an overall evaluation of the emotion information generated in a predetermined period prior to generation of the comprehensive evaluation. In particular, the comprehensive evaluation is, for example, a mean value of the emotion information generated in the predetermined period.

In a case in which the electronic device 14 configured to perform the monitoring operation is the first electronic device 11, the controller 24 issues the emotion information and the comprehensive evaluation thus generated, based on a viewing request form the guardian. The viewing request from the guardian may be detected as, for example, an input to at least one of the input interface 22 and the microphone 18. The emotion information and the comprehensive evaluation are notified as a sound generated by the speaker 19 and a display displayed on the display 21.

Figure 4:
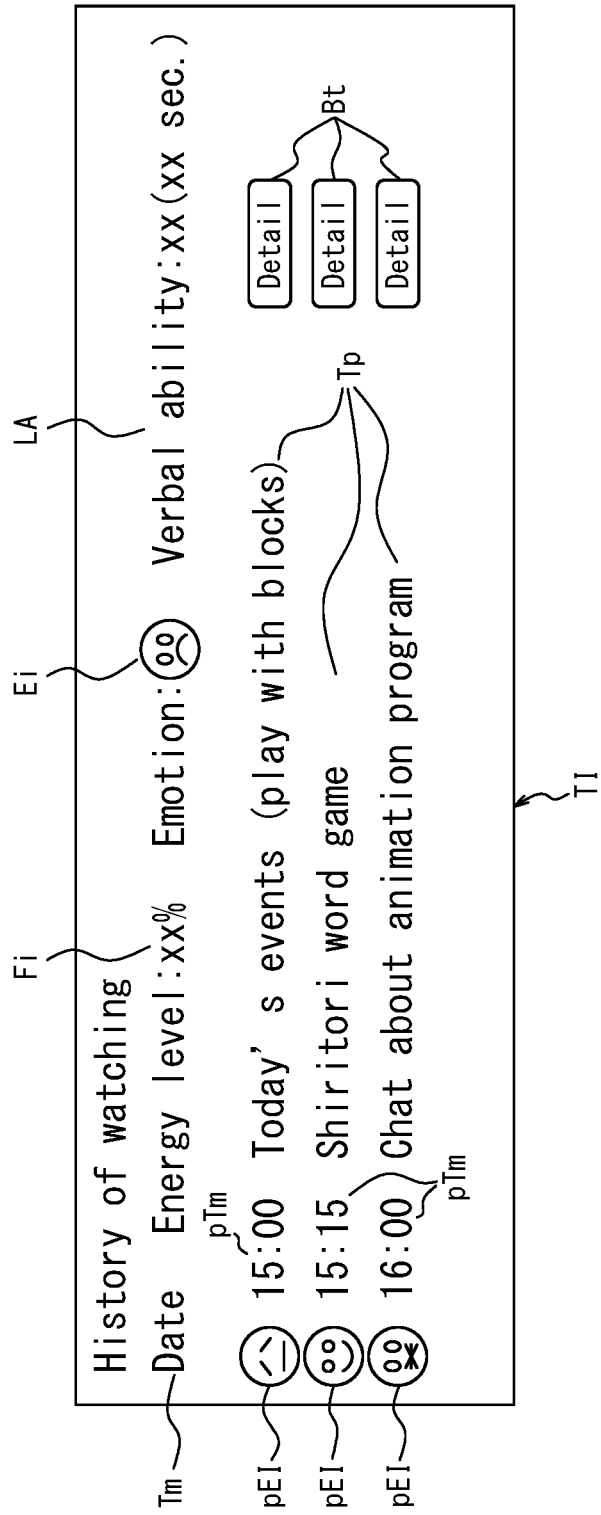
FIG. 4 is a conceptual diagram of a comprehensive evaluation image displayed on a display of the electronic device of FIG. 3.

In the present embodiment, the controller 24 displays a comprehensive evaluation image, as illustrated in FIG. 4 by way of example, on the display 21. In the comprehensive evaluation image, the comprehensive evaluation is displayed as a monitoring history. The comprehensive evaluation image TI includes a comprehensive evaluation generation time Tm, an energy level Fi and an emotion level Ei constituting the comprehensive evaluation, the vocabulary and the response speed LA as a verbal ability, emotion information for each interaction pEI, a start time pTm of each interaction, a topic Tp of an interaction, and detail display buttons Bt. The controller 24 may indicate the emotion level Ei using an icon representing an emotion. In a case in which any one of the energy level Fi and the emotion level Ei constituting the comprehensive evaluation, and the verbal ability deviates from the respective mean values, such deviating items may be highlighted. When a contact in respect of one of the detail display buttons Bt is detected, the controller 24 displays details of a corresponding interaction on the display 21.

In a case in which the electronic device 14 configured to perform the monitoring operation is the second electronic device 12, the controller 24 causes the communication interface 15 to transmit the generated emotion information and comprehensive evaluation as the monitoring information to the first electronic device 11 owned by the stored guardian.

The first electronic device 11 receives the emotion information and the comprehensive evaluation from the second electronic device 12 and thus can report the emotion information and the comprehensive evaluation to the guardian, who is the owner of the first electronic device 11. The first electronic device 11 notifies the emotion information and the comprehensive evaluation to the guardian by outputting a sound from the speaker 19 and displaying a screen on the display 21, in a manner similar to the case in which it is mounted on the charging stand 13.

Further, in the monitoring operation, the controller 24 determines whether an abnormality has occurred in respect of the person being monitored, based on ambient sound detected by the microphone 18 and images of the surroundings captured by the camera 20. The abnormality may be a state that continues for a predetermined period or longer, such as at least one of, for example, a state in which the person being monitored cannot be detected, a state in which a moving speed of the person being monitored is slower than a threshold moving speed, a state in which an expression of the person being monitored indicates pain, a state in which the conversation by the person being monitored continuously includes strong negative words, a state in which the person being monitored is seeking rescue, and a state in which a person other than the person being monitored or the guardian is detected.

When the electronic device 14 configured to perform the monitoring operation is the first electronic device 11 and during the monitoring operation it is determined that an abnormality has occurred, the controller 24 notifies the guardian of the occurrence of the abnormality. The occurrence of the abnormality is notified in the form of a sound output from the speaker 19 and a warning screen displayed on the display 21.

When the electronic device 14 configured to perform the monitoring operation is the second electronic device 12 and during the monitoring operation it is determined that an abnormality has occurred, the controller 24 causes the communication interface 15 to report the occurrence of the abnormality as the monitoring information to the first electronic device 11, which is owned by the stored guardian.

The first electronic device 11 can notify the guardian, who is the owner of the first electronic device 11, of the occurrence of the abnormality, by receiving the abnormality notification from the second electronic device 12. The first electronic device 11 notifies the occurrence of the abnormality in the form of a sound output from the speaker 19 and a warning screen displayed on the display 21, in a manner similar to the case in which it is mounted on the charging stand 13.

The controller 24 performs a data communication operation to send/receive an email or display an image using a browser, or perform a telephone call operation, based on an input to the input interface 22, regardless of whether transition to the communication mode is performed.

The charging stand 13 includes a communication interface 25, a power supply unit 26, a changing mechanism 27, a microphone 28, a speaker 29, a camera 30, a motion sensor 31, a mount sensor 32, a memory 33, a controller 34, and the like.

The communication interface 25 includes a communication interface capable of performing communication using voice, characters, or images, in a manner similar to the communication interface 15 of the electronic device 14. The communication interface 25 communicates with the electronic device 14 by performing wired or wireless communication. The communication interface 25 may communicate with an external device by performing wired communication or wireless communication.

The power supply unit 26 supplies electric power to the power receiving unit 16 of the electronic device 14 mounted on the charging stand 13. The power supply unit 26 supplies electric power to the power receiving unit 16 in a wired or wireless manner, as described above.

The changing mechanism 27 changes an orientation of the electronic device 14 mounted on the charging stand 13. The changing mechanism 27 can change the orientation of the electronic device 14 along at least one of the vertical direction and the horizontal direction that are defined with respect to a bottom surface bs (see FIGS. 1 and 2), which is defined with respect to the charging stand 13. The changing mechanism 27 includes a built-in motor and changes the orientation of the electronic device 14 by driving the motor.

The microphone 28 detects voice originating from the vicinity of the charging stand 13 and converts the voice into an electrical signal. The microphone 28 outputs the detected voice to the controller 34.

The speaker 29 outputs voice based on control by the controller 34.

The camera 30 captures a subject located within an imaging range. The camera 30 can capture both still images and video. When capturing video, the camera 30 successively captures the subject at a speed of, for example, 60 fps. The camera 30 outputs the captured image to the controller 34.

The motion sensor 31 is configured as, for example, an infrared sensor and detects the presence of a person around the charging stand 13 by detecting heat. When the motion sensor 31 detects the presence of a person, the motion sensor 31 notifies the controller 34 to that effect. Note that the motion sensor 31 may be a sensor other than the infrared sensor such as, for example, an ultrasonic sensor. Alternatively, the motion sensor 31 may cause the camera 30 to detect the presence of a person based on a change in images continuously captured. The motion sensor 31 may be configured to cause the microphone 28 to detect the presence of a person based on a detected voice.

The mount sensor 32 of the charging stand 13 is arranged on, for example, a mounting surface for mounting the electronic device 14 and detects the presence or absence of the electronic device 14. The mount sensor 32 is configured as, for example, a piezoelectric element or the like. When the electronic device 14 is mounted, the mount sensor 32 notifies the controller 34 to that effect.

The memory 33 may be configured as, for example, a semiconductor memory, a magnetic memory, an optical memory, or the like. For example, the memory 33 stores an image associated with a user registration, user information, and monitoring information acquired from the electronic device 14 for each electronic device 14 and each registered user. For example, the memory 33 stores the content of a conversation for each user acquired from the electronic device 14. For example, the memory 33 stores information for driving the changing mechanism 27 based on an imaging result acquired by the camera 20, as will be described later.

The controller 34 includes one or more processors, in a manner similar to the controller 24 of the electronic device 14. The controller 34 may include one or more memories for storing programs and information being calculated for use in various operations, in a manner similar to the controller 24 of the electronic device 14.

The controller 34 causes the electronic device 14 to maintain the communication mode from when the mount sensor 32 detects the mounting of the electronic device 14 to when the mount sensor 32 detects the removal of the electronic device 14, that is, while the electronic device 14 is mounted on the charging stand 13. Thus, while the electronic device 14 is mounted on the charging stand 13, the controller 34 can cause the electronic device 14 to perform at least one of the speech operation and the voice recognition operation.

The controller 34 activates the camera 30 to capture images of the surroundings while the electronic device 14 is mounted on the charging stand 13. The controller 34 detects human faces in the captured images. The controller 34 identifies a captured user by comparing a detected image of the human face with the images of faces stored in the memory 33. The controller 34 notifies the electronic device 14 of the identified user.

After identifying the captured user, the controller 34 causes the camera 30 to maintain imaging and searches for the user's face in each image. The controller 34 drives the changing mechanism 27 such that the display 21 of the electronic device 14 is directed to the user based on a location of the face found in the images.

When the mount sensor 32 detects the mounting of the electronic device 14, the controller 34 starts the transition of the electronic device 14 to the communication mode. Thus, when the electronic device 14 is mounted on the charging stand 13, the controller 34 causes the electronic device 14 to start execution of at least one of the speech operation and the voice recognition operation.

The controller 34 may add detection of a person by the motion sensor 31 to a condition for starting at least one of the speech operation and the voice recognition operation. For example, when the motion sensor 31 detects the presence of a person after detecting that the electronic device 14 is mounted on the charging stand 13, the controller 34 may start the speech operation or the voice recognition operation.

When the mount sensor 32 detects removal of the electronic device 14, the controller 34 ends the communication mode of the electronic device 14. Thus, when the electronic device 14 is removed from the charging stand 13, the controller 34 causes the electronic device 14 to end the execution of at least one of the speech operation and the voice recognition operation.

When the controller 34 acquires the content of a conversation for each user from the electronic device 14, the controller 34 causes the memory 33 to store the content of the conversation for each electronic device 14. The controller 34 causes different electronic devices 14 which directly or indirectly communicate with the charging stand 13 to share the content of the conversations, as appropriate. Note that the indirect communication with the charging stand 13 includes at least one of communication via a telephone line when the charging stand 13 is connected to the telephone line and communication via the electronic device 14 mounted on the charging stand 13.

When the controller 34 receives an instruction to perform the monitoring operation from the electronic device 14, the controller 34 performs the monitoring operation. In the monitoring operation, the controller 34 activates the camera 30 to sequentially capture a specific target. The controller 34 extracts the specific target in the images captured by the camera 30. The controller 34 determines a state of the extracted specific target based on image recognition or the like. The state of the specific target includes, for example, an abnormal state in which the specific user falls down and does not get up or detection of a moving object in a vacant home. When the controller 34 determines that the specific target is in an abnormal state, the controller 34 notifies that the specific target is in an abnormal state to the electronic device 14 which issued the instruction to perform the monitoring operation.

Figure 5:
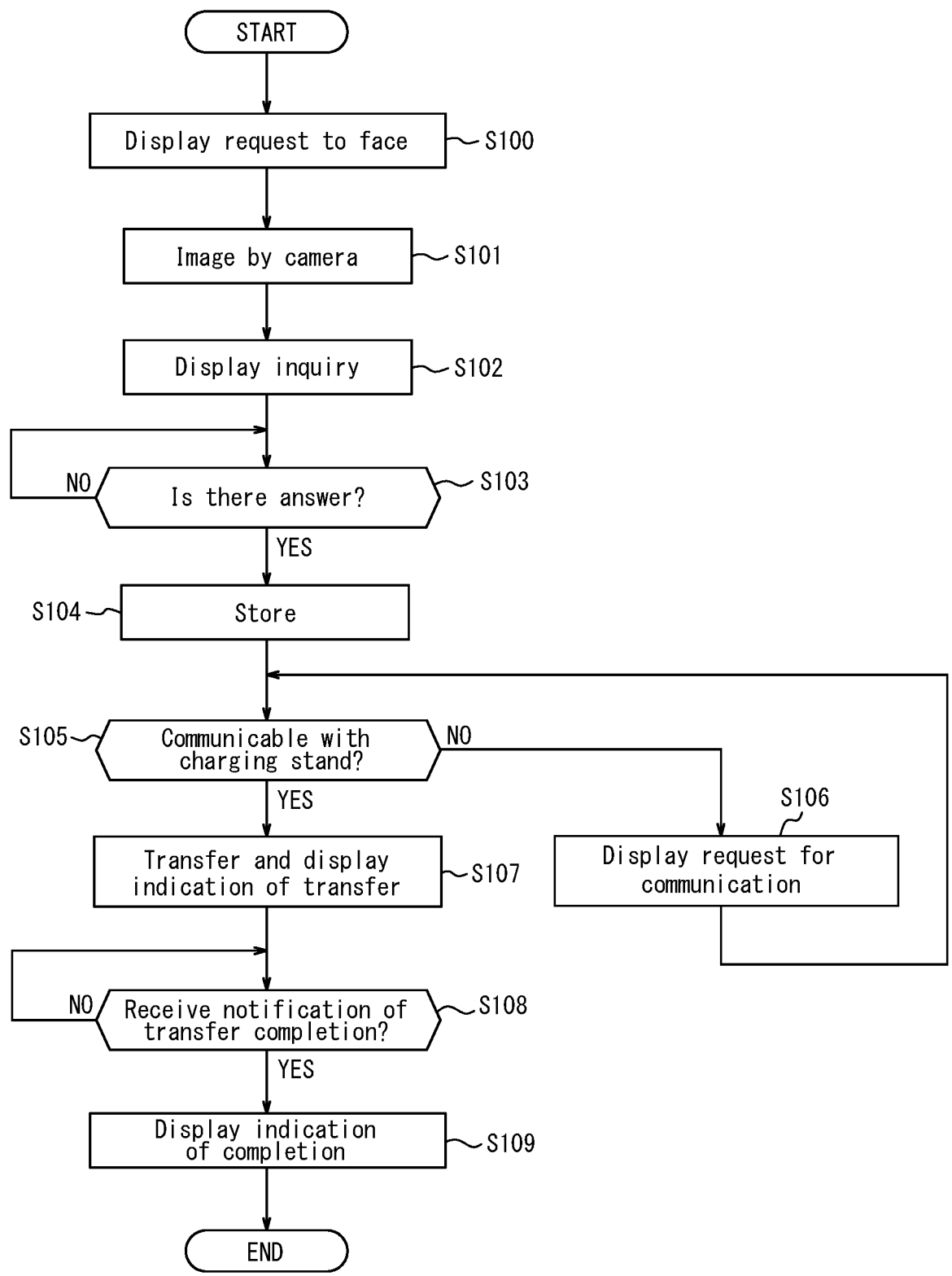
FIG. 5 is a flowchart illustrating an initial setting operation performed by a controller of the electronic device of FIG. 3.

Next, an initial setting operation performed by the controller 24 of the electronic device 14 according to the present disclosure will be described with reference to the flowchart of FIG. 5. The initial setting operation starts when the input interface 22 detects a user input for starting the initial setting.

In step S100, the controller 24 displays a request to face the camera 20 of the electronic device 14 on the display 21. After the request is displayed on the display 21, the process proceeds to step S101.

The controller 24 causes the camera 20 to capture an image in step S101. After an image is captured, the process proceeds to step S102.

The controller 24 displays a question asking the name and the attributes of the user on the display 21 in step S102. After the question has been displayed, the process proceeds to step S103.

In step S103, the controller 24 determines whether there is an answer to the question of step S102. When there is no answer, the process repeats step S103. When there is an answer, the process proceeds to step S104.

In step S104, the controller 24 associates the image of the face captured in step S102 with the answer to the question detected in step S103 as user information and stores them in the memory 23. After the storing, the process proceeds to step S105.

The controller 24 determines whether the controller 24 can communicate with the charging stand 13 in step S105. When the controller 24 cannot communicate with the charging stand 13, the process proceeds to step S106. When the controller 24 can communicate with the charging stand 13, the process proceeds to step S107.

In step S106, the controller 24 displays a request for an action that enables communication with the charging stand 13 on the display 21. The request for an action that enables communication may be, for example, a message "Mount the mobile terminal on the charging stand" in the configuration in which the electronic device 14 and the charging stand 13 perform wired communication. The request for an action that enables communication may be, for example, a message "Move the mobile terminal close to the charging stand" in the configuration in which the electronic device 14 and the charging stand 13 perform wireless communication. After the request is displayed, the process returns to step S105.

In step S107, the controller 24 transfers the image of the face stored in step S104 and the user information to the charging stand 13. Also, the controller 24 displays an indication that the transfer is in progress on the display 21. After the start of the transfer, the process proceeds to step S108.

The controller 24 determines whether a transfer completion notification is received from the charging stand 13 in step S108. When the transfer completion notification is not received, the process repeats step S108. When the transfer completion notification is received, the process proceeds to step S109.

The controller 24 displays an indication of the completion of initial setting on the display 21 in step S109. After the indication is displayed, the initial setting ends.

Figure 6:
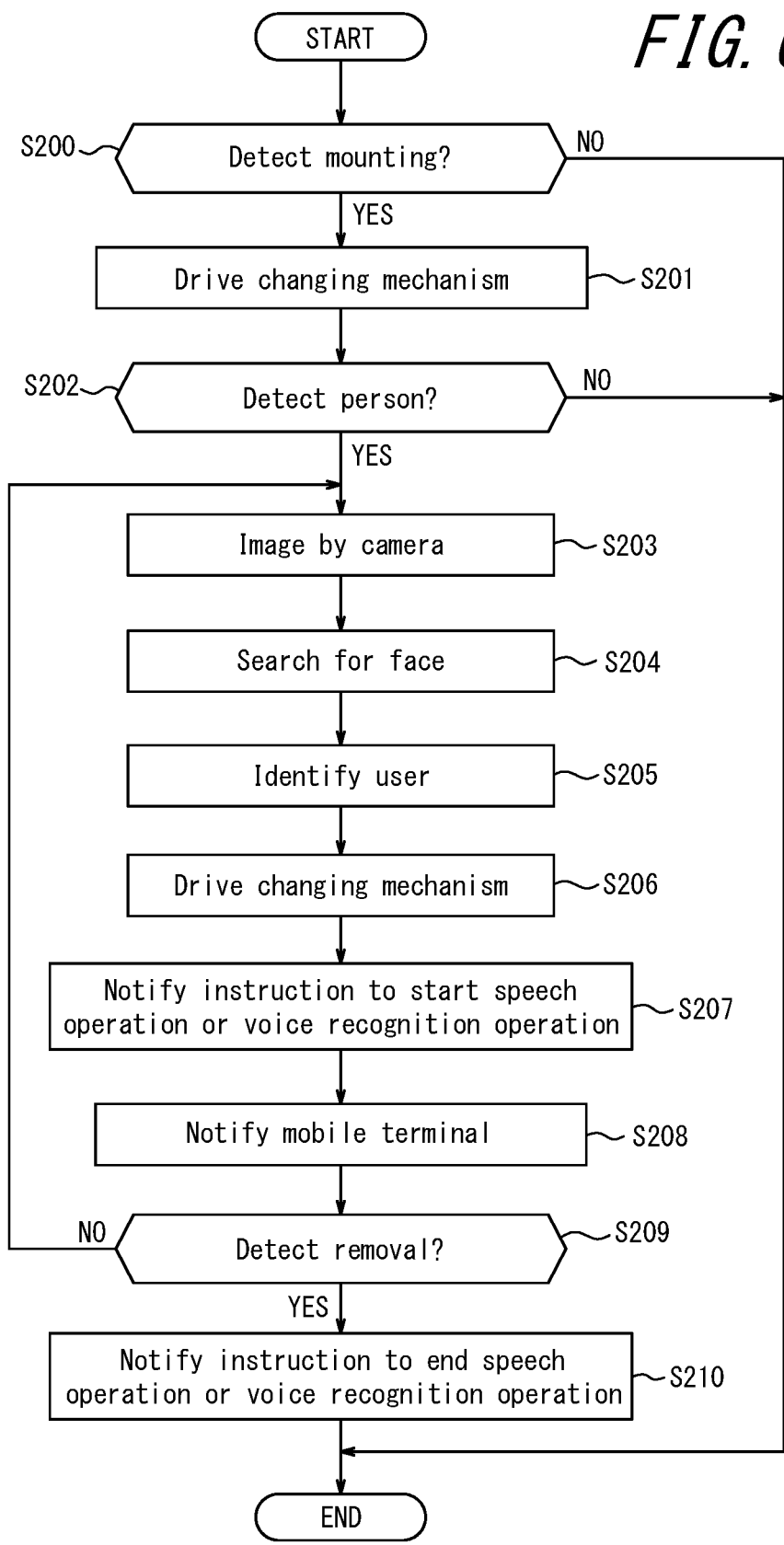
FIG. 6 is a flowchart illustrating a speech execution determination operation performed by a controller of the charging stand of FIG. 3.

Next, a speech execution determination operation performed by the controller 34 of the charging stand 13 according to the present disclosure will be described with reference to the flowchart of FIG. 6. The speech execution determination operation starts periodically.

In step S200, the controller 34 determines whether the mount sensor 32 is detecting the mounting of the electronic device 14. When the mount sensor 32 is detecting the mounting, the process proceeds to step S201. When the mount sensor 32 is not detecting the mounting, the speech execution determination operation ends.

In step S201, the controller 34 drives the changing mechanism 27 and the motion sensor 31 to detect the presence or absence of a person in the vicinity of the charging stand 13. After the changing mechanism 27 and the motion sensor 31 are driven, the process proceeds to step S202.

In step S202, the controller 34 determines whether the motion sensor 31 is detecting a person in the vicinity of the charging stand 13. When a person is detected, the process proceeds to step S203. When a person is not detected, the speech execution determination operation ends.

The controller 34 causes the camera 30 to capture an image of the surroundings in step S203. After the image has been captured, the process proceeds to step S204.

In step S204, the controller 34 searches for a face of the person included in the image captured in step S203. After searching for the face, the process proceeds to step S205.

In step S205, the controller 34 compares the face searched in step S204 with an image of a registered face stored in the memory 33 and thus identifies the captured user. After identification, the process proceeds to step S206.

In step S206, the controller 34 drives the changing mechanism 27 such that the display 21 of the electronic device 14 is directed to the direction of the user's face captured in step S203 based on the location of the face searched in step S204. After the changing mechanism 27 has been driven, the process proceeds to step S207.

In step S207, the controller 34 notifies the electronic device 14 of an instruction to start at least one of the speech operation and the voice recognition operation. After notifying the electronic device 14, the process proceeds to step S208.

In step S208, the controller 34 notifies the electronic device 14 of the user identified in step S205. After the notification, the process proceeds to step S209.

In step S209, the controller 34 determines whether the mount sensor 32 detects removal of the electronic device 14. When the mount sensor 32 does not detect the removal, the process returns to step S203. When the mount sensor 32 detects the removal, the process proceeds to step S210.

In step S210, the controller 34 notifies the electronic device 14 of an instruction to end at least one of the speech operation and the voice recognition operation. After the notification to the electronic device 14, the speech execution determination operation ends.

Figure 7:
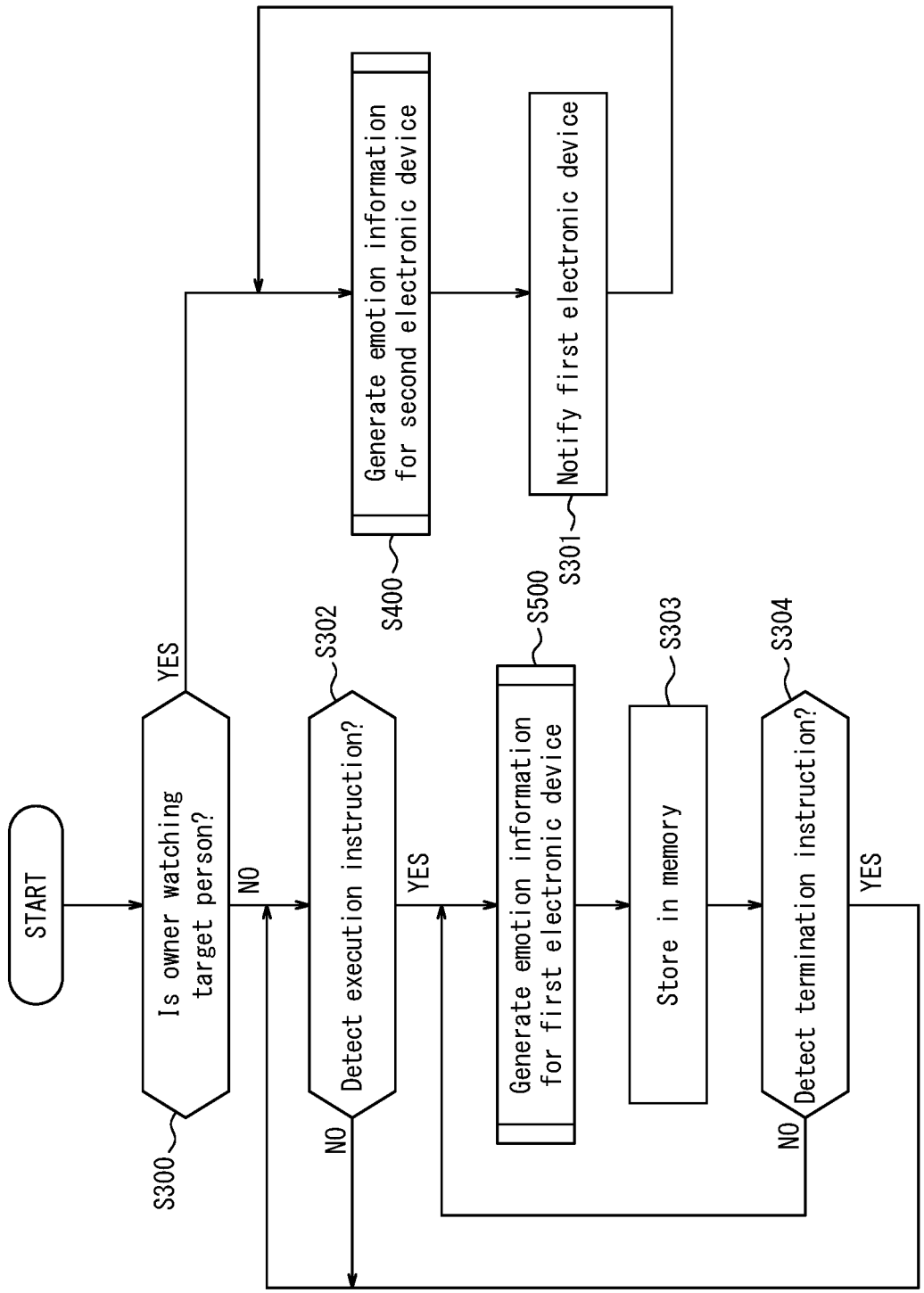
FIG. 7 is a flowchart illustrating a monitoring execution determination operation performed by the controller of the electronic device of FIG. 3.

Next, a monitoring execution determination operation performed by the controller 24 of the electronic device 14 of the present disclosure will be described with reference to the flowchart of FIG. 7. The monitoring execution determination operation starts when the electronic device 14 owned by the guardian or the person being monitored receives an instruction to start the speech operation and the voice recognition operation from the charging stand 13. The monitoring execution determination operation ends when the electronic device 14 receives an instruction to end the speech operation and the voice recognition operation from the charging stand 13.

In step S300, the controller 24 determines whether the owner of the electronic device 14 is the person being monitored, based on the user information and the monitoring information stored in the memory 23. When the owner is the person being monitored, the process proceeds to step S400. When the owner is not the person being monitored, the process proceeds to step S302.

At step S400, the controller 24 performs an emotion information generating subroutine for the second electronic device 12, as will be described later. After performing the emotion information generating subroutine for the second electronic device 12, the process proceeds to step S301.

In step S301, the controller 24 causes the communication interface 15 to report at least one of the emotion information and the comprehensive evaluation generated in step S400 to the first electronic device 11 owned by the guardian. After that, the process returns to step S400.

In step S302, the controller 24 determines whether the microphone 18 is detecting a voice of the guardian to instruct execution of the monitoring operation. When the voice is not detected, the process returns to step S302. When the voice is detected, the process proceeds to step S500.

In step S500, the controller 24 performs the emotion information generating subroutine for the first electronic device 11, as will be described later. After performing the emotion information generating subroutine for the first electronic device 11, the process proceeds to step S303.

In step S303, the controller 24 stores at least one of the emotion information and the comprehensive evaluation generated in step S500 in the memory 23. After the storing, the process proceeds to step S304.

In step S304, the controller 24 determines whether a voice of the guardian to instruct ending the monitoring operation is detected. When the voice is not detected, the process returns to step S303. When the voice is detected, the process returns to step S302.

Figure 8:
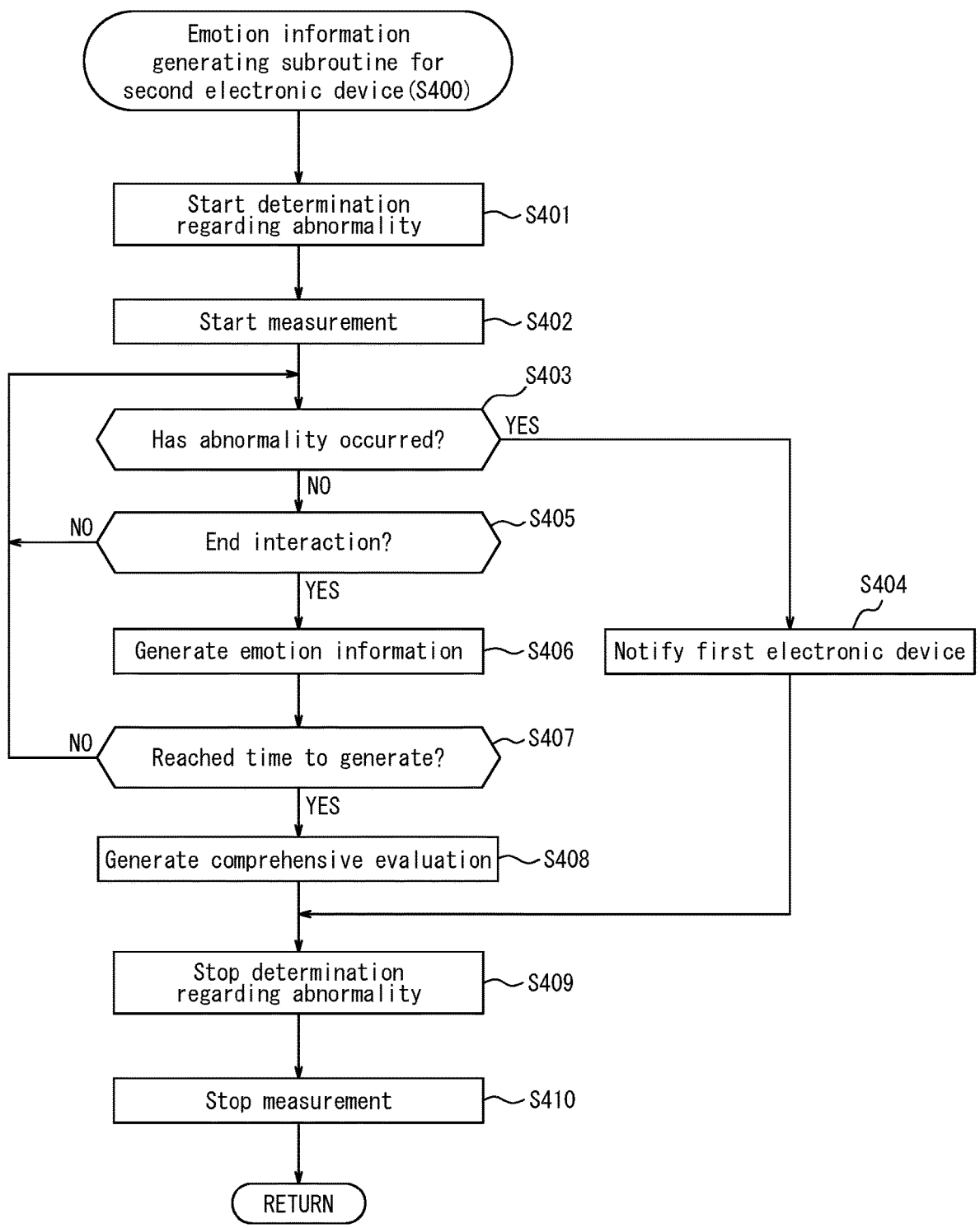
FIG. 8 is a flowchart illustrating an emotion information generating subroutine for a second electronic device performed by the controller of the electronic device of FIG. 3.

Next, an emotion information generating subroutine S400 for the second electronic device 12 performed by the controller 24 of the electronic device 14 of the present disclosure will be described with reference to the flowchart of FIG. 8.

In step S401, the controller 24 starts the determination whether an abnormality has occurred in respect of the person being monitored, based on ambient sound detected by the microphone 18 and an image of the surroundings captured by the camera 20. After the start of the determination, the process proceeds to step S402.

In step S402, the controller 24 starts measurement of at least one of the quality of the voice of the person being monitored, the character of the recognized content of the speech, the volume and vocabulary of the speech, and the response speed, in the voice recognition operation. After the start of the measurement, the process proceeds to step S403.

In step S403, the controller 24 determines whether an abnormality has occurred in respect of the person being monitored. When an abnormality has occurred, the process proceeds to step S404. When an abnormality has not occurred, the process proceeds to step S405.

In step S404, the controller 24 causes the communication interface 15 to notify the first electronic device 11 owned by the guardian of the occurrence of an abnormality to the person being monitored. After that, the process proceeds to step S409.

In step S405, the controller 24 determines whether an interaction with the person being monitored is temporarily finished. For example, when there is no response from the person being monitored to an interaction by the electronic device 14 for a predetermined period, the controller 24 determines that the interaction is temporarily finished. When the interaction has not finished, the process returns to step S403. When the interaction has finished, the process proceeds to step S406.

In step S406, the controller 24 generates emotion information associated with the interaction, which is determined to have been finished in step S405. After the generating, the process proceeds to step S407.

In step S407, the controller 24 determines whether the time to generate the comprehensive evaluation has been reached. The time to generate the comprehensive evaluation is, for example, a particular time, in a case in which the comprehensive evaluation is regularly generated. The time to generate the comprehensive evaluation is, for example, when a predetermined time has elapsed after generation of previous comprehensive evaluation, in a case in which the comprehensive evaluation is periodically generated. When the time to generate the comprehensive evaluation has not yet been reached, the process returns to step S403. When the time to generate the comprehensive evaluation has arrived, the process proceeds to step S408.

In step S408, the controller 24 generates the comprehensive evaluation. After generation, the process proceeds to step S409.

In step S409, the controller 24 ends determination of whether an abnormality has occurred in respect of the person being monitored. After ending the determination, the process proceeds to step S410.

In step S410, the controller 24 ends measurement of the at least one of the quality of the voice of the person being monitored, the character of the recognized content of the speech, the volume and vocabulary of the speech, and the response speed, in the voice recognition operation. After ending the measurement, the emotion information generating subroutine S400 for the second electronic device 12 is ended, and the process returns to step S301 (see FIG. 7) of the monitoring execution determination operation.

Figure 9:
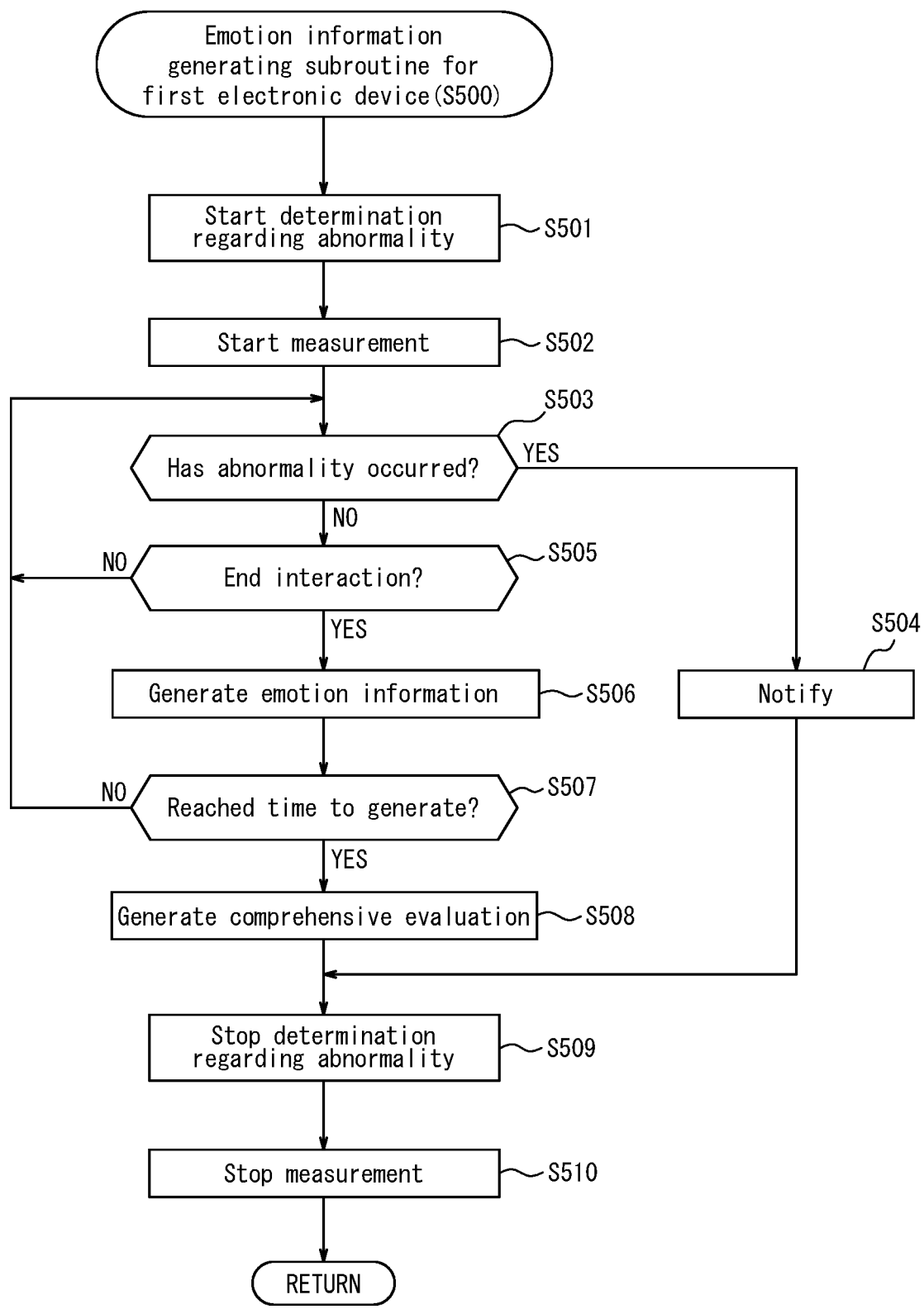
FIG. 9 is a flowchart illustrating an emotion information generating subroutine for a first electronic device performed by the controller of the electronic device of FIG. 3.

Next, the emotion information generating subroutine S500 for the first electronic device 11 performed by the controller 24 of the electronic device 14 of the present disclosure will be described with reference to the flowchart of FIG. 9.

In steps S501 to S503, the controller 24 performs the same control as those of steps S401 to S403 of the emotion information generating subroutine S400 for the second electronic device 12. When it is determined that an abnormality has occurred in step S503, the process proceeds to step S504.

In step S504, the controller 24 causes at least one of the speaker 19 and the display 21 to notify the guardian of the occurrence of an abnormality to the person being monitored. After that, the process proceeds to step S509.

In steps S505 to S510, the controller 24 performs the same control as those of steps S405 to S410 of the emotion information generating subroutine S400 for the second electronic device 12. After ending the measurement in step S510, the controller 24 ends the emotion information generating subroutine S500 for the first electronic device 11 and returns to step S303 of the monitoring execution determination operation (see FIG. 7).

The electronic device 14 according to the present embodiment having the above configuration generates the emotion information for the person being monitored, based on the voice recognition operation. Thus, the electronic device 14 can obtain information that is subjected to processing for enabling easy understanding of an emotion of the person being monitored, without the necessity for a specific test or the like. Accordingly, the electronic device 14 can enable the guardian to easily understand an emotion of the person being monitored. In this way, the electronic device 14 has improved functionality, as compared to conventional electronic devices.

The electronic device 14 according to the present embodiment transmits the emotion information to the first electronic device 11, which is another electronic device. This configuration enables the electronic device 14 to report the emotion information to the first electronic device 11 even when the first electronic device 11 is located remote from the person being monitored. Thus, the electronic device 14 can report the emotion information for the person being monitored to the guardian who is located remote from the person being monitored.

The electronic device 14 according to the present embodiment displays the emotion information on the display 21. Thus, the electronic device 14 can enable the guardian who is using the electronic device 14 to view the emotion information.

The electronic device 14 according to the present embodiment generates emotion information for each registered person being monitored. Thus, the electronic device 14 can provide respective emotion information for a plurality of people being monitored.

The electronic device 14 according to the present embodiment determines whether an abnormality has occurred in respect of the person being monitored during the monitoring operation, based on ambient sound and an image of the surroundings. Thus, the electronic device 14 can enable the guardian to recognize a state of the person being monitored, whose state and emotion the guardian desires to recognize, in addition to generating the emotion information for the person being monitored.

When the electronic device 14 according to the present embodiment determines that an abnormality has occurred in respect of the person being monitored, the electronic device 14 notifies the occurrence of the abnormality to the first electronic device 11, which is another electronic device. Thus, the electronic device 14 can report the occurrence of the abnormality even when the first electronic device 11 is located remote from the person being monitored. Accordingly, the electronic device 14 can enable the guardian, who is located remote from the person being monitored, to recognize the occurrence of the abnormality to the person being monitored.

When the electronic device 14 according to the present embodiment determines that an abnormality has occurred in respect of the person being monitored, the electronic device 14 notifies the occurrence of the abnormality. Thus, the electronic device 14 enables the guardian who is using the electronic device 14 to recognize the occurrence of the abnormality to the person being monitored, without the necessity for monitoring the person being monitored at all times.

The electronic device 14 according to the present embodiment acquires the emotion information from the second electronic device 12, which is another electronic device, and displays the emotion information. Thus, the electronic device 14 can enable the guardian who is using the electronic device 14 to view the emotion information for the person being monitored.

When the electronic device 14 is mounted on the charging stand 13 according to the present embodiment, the charging stand 13 causes the electronic device 14 to perform at least one of the speech operation and the voice recognition operation. The charging stand 13 having the above configuration functions as a companion for the user to talk with, together with the electronic device 14 that executes predetermined functions on its own. Thus, the charging stand 13 can function to keep company with elderly living alone when they have a meal, and prevent them from feeling lonely. Thus, the charging stand 13 has improved functionality as compared to conventional charging stands.

The charging stand 13 according to the present embodiment causes the electronic device 14 to start at least one of the speech operation and the voice recognition operation when the electronic device 14 is mounted on the charging stand 13. Thus, the charging stand 13 can cause the electronic device 14 to start an interaction with a user simply in response to the mounting of the electronic device 14 on the charging stand 13, without the necessity for a complicated input operation.

The charging stand 13 according to the present embodiment causes the electronic device 14 to end the at least one of the speech operation and the voice recognition operation when the electronic device 14 is removed. Thus, the charging stand 13 can end an interaction with a user simply in response to the removal of the electronic device 14, without the necessity for a complicated input operation.

The charging stand 13 according to the present embodiment drives the changing mechanism 27 such that the display 21 of the electronic device 14 is directed to the user targeted for interaction concerned in at least one of the speech operation and the voice recognition operation. Thus, the charging stand 13 can enable the user to feel like as if the electronic device 14 mounted on the charging stand 13 is an actual person during an interaction with the user.

The charging stand 13 according to the present embodiment can enable different electronic devices 14 that communicate with the charging stand 13 to share the content of conversations by users. The charging stand 13 configured in this manner can enable another user to recognize the content of the conversation by a specific user. Thus, the charging stand 13 can enable a family member at a remote location to share the content of the conversation and facilitate communication within the family.

The charging stand 13 according to the present embodiment determines a state of a specific target and, when it determines that there is an abnormal state, it notifies the user of the electronic device 14 to that effect. Thus, the charging stand 13 can monitor the specific target.

The electronic device 14 according to the present embodiment determines a speech to output to a user targeted for interaction, based on the content of past conversations, a voice, an installation location of the charging stand 13 on which the electronic device 14 is mounted, or the like. Thus, the electronic device 14 mounted on the charging stand 13, together with the charging stand 13, can have a conversation corresponding to the content of a current conversation with the user, the contents of past conversations with the user, or the installation location of the charging stand 13.

The electronic device 14 according to the present embodiment, together with the charging stand 13 on which the electronic device 14 is mounted, learns a behavior history of a specific user and outputs advice to the user. The electronic device 14 the above configuration, together with the charging stand 13, can notify a time to take a medicine, suggest meals that match user's liking, suggest a healthy diet for the user, or suggest an effective exercise the user can continue, and thus can remind the user of something or tell the user something new to the user.

Further, the electronic device 14 according to the present embodiment, together with the charging stand 13 on which the electronic device 14 is mounted, notifies information associated with the current location. Thus, the electronic device 14 mounted on the charging stand 13, together with the charging stand 13, can inform the user of local information specific to the neighborhood of the user's home.

Although the disclosure has been described based on the drawings and the embodiments, it is to be understood that various changes and modifications may be implemented based on the present disclosure by those who are ordinarily skilled in the art. Accordingly, such changes and modifications are included in the scope of the disclosure.

For example, although in the present embodiment the controller 24 of the electronic device 14 performs the voice recognition operation and the monitoring operation in association with the voice detected by the microphone 18 of the electronic device 14, the two electronic devices 14 including the first electronic device 11 and the second electronic device 12 may perform the above operation in cooperation. For example, the first electronic device 11 may acquire a voice detected by the microphone 18 of the second electronic device 12, and the controller 24 of the first electronic device 11 may perform the voice recognition operation and the monitoring operation. Alternatively, for example, the controller of the second electronic device 12 may perform the voice recognition operation on a voice detected by the microphone 18 of the second electronic device 12, and the first electronic device 11 may acquire a result of the voice recognition operation, and the controller 24 of the first electronic device 11 may perform the voice recognition operation and the monitoring operation.

Although in the present embodiment the controller 24 of the electronic device 14 performs the speech operation, the voice recognition operation, the conversation learning, the lifestyle learning, and the advising based on the learning of the lifestyle, notification of information associated with a current location, and the monitoring operation, the controller 34 of the charging stand 13 may perform these operations. In a configuration in which the controller 34 of the charging stand 13 performs these operations, the microphone 28, the speaker 29, and the camera 30 of the charging stand 13 may be driven for the interaction with the user, or the microphone 18, the speaker 19, and the camera 20 of the electronic device 14 may be driven via the communication interfaces 25 and 15.

Further, although the controller 34 of the charging stand 13 determines whether to perform at least one of the speech operation and the voice recognition operation, the controller 24 of the electronic device 14 may perform this determination.

In the present embodiment, also, the example variations described above may be combined, such that the controller 34 of the charging stand 13 performs the speech operation, the voice recognition operation, the conversation learning, the lifestyle learning, the advising based on the lifestyle learning, the notification of information associated with a current location, and the monitoring operation, and the controller 42 of the electronic device 14 determines whether to perform at least one of the speech operation and the voice recognition operation.

Further, although the controller 24 of the electronic device 14 performs the registration operation in the present embodiment, the controller 34 of the charging stand 13 may perform the registration operation.

The network used herein includes, unless otherwise specified, the Internet, an ad hoc network, LAN (Local Area Network), WAN (Wide Area Network), MAN (Metropolitan Area Network), a cellular network, WWAN (Wireless Wide Area Network), WPAN (Wireless Personal Area Network), PSTN (Public Switched Telephone Network), terrestrial wireless network (Terrestrial Wireless Network), other network, or any combination thereof. An element of the wireless network includes, for example, an access point (e.g., a Wi-Fi access point), a Femtocell, or the like. Further, a wireless communication apparatus may connected to a wireless network that uses Wi-Fi, Bluetooth, a cellular communication technology (e.g. CDMA (Code Division Multiple Access), TDMA (Time Division Multiple Access), FDMA (Frequency Division Multiple Access), OFDMA (Orthogonal Frequency Division Multiple Access), SC-FDMA (Single-Carrier Frequency Division Multiple Access)), or other wireless technologies and/or technical standards. The network can employ one or more technologies, such as UTMS (Universal Mobile Telecommunications System), LTE (Long Term Evolution), EV-DO (Evolution-Data Optimized or Evolution-Data), GSM® (Global System for Mobile communications, GSM is a registered trademark in Japan, other countries, or both), WiMAX (Worldwide Interoperability for Microwave Access), CDMA-2000

(Code Division Multiple Access-2000), or TD-SCDMA (Time Division Synchronous Code Division Multiple Access).

Circuit configurations of the communication interfaces 15 and 25 provide functionality by using various wireless communication network such as, for example, WWAN, WLAN, WPAN, or the like. WWAN may include CDMA network, TDMA network, FDMA network, OFDMA network, SC-FDMA network, or the like. CDMA network may implement one or more RAT (Radio Access Technology) such as CDMA2000, Wideband-CDMA (W-CDMA), or the like. CDMA2000 includes a standard such as IS-95, IS-2000, or IS-856. TDMA network may implement RAT such as GSM, D-AMPS (Digital Advanced Phone System), or the like. GSM and W-CDMA are described in documents issued by a consortium called 3rd Generation Partnership Project (3GPP). CDMA2000 is described in documents issued by a consortium called 3rd Generation Partnership Project 2 (3GPP2). WLAN may include IEEE802.11x network. WPAN may include Bluetooth network, IEEE802.15x, or other types of network. CDMA may be implemented as a wireless technology such as UTRA (Universal Terrestrial Radio Access) or CDMA2000. TDMA may be implemented by using a wireless technology such as GSM/GPRS (General Packet Radio Service)/EDGE (Enhanced Data Rates for GSM Evolution). OFDMA may be implemented by a wireless technology such as IEEE (Institute of Electrical and Electronics Engineers) 802.11 (Wi-Fi), IEEE802.16 (WiMAX), IEEE802.20, E-UTRA (Evolved UTRA), or the like. These technologies can be used for any combination of WWAN, WLAN and/or WPAN. Also, these technologies may be implemented to use UMB (Ultra Mobile Broadband) network, HRPD (High Rate Packet Data) network, CDMA20001X network, GSM, LTE (Long-Term Evolution), or the like.

The memories 23 and 33 described above may store an appropriate set of computer instructions, such as program modules, and data structures that are used to cause a processor to perform the techniques disclosed herein. A computer-readable medium includes electrical connections through one or more wires, a magnetic disk storage, a magnetic cassette, a magnetic tape, another magnetic or optical storage device (e.g., CD (Compact Disk), Laser Disc® (Laser Disc is a registered trademark in Japan, other countries, or both), DVD (Digital Versatile disc), Floppy Disk, or Blu-ray Disc), a portable computer disk, RAM (Random Access memory), ROM (Read-Only memory), EPROM, EEPROM, a ROM such as a flash memory which is rewritable and programmable, other tangible storage media capable of storing information, or any combination thereof. The memory may be provided within and/or external to the processor/processing unit. As used herein, the term "memory" means any kind of a long-term storage, a short-term storage, a volatile memory, a nonvolatile memory, or other memories, and does not limit a type of a memory, the number of memories, and a type of a medium for storing.

Note that a system as disclosed herein includes various modules and/or units configured to perform a specific function, and these modules and units are schematically illustrated to briefly explain their functionalities and do not specify particular hardware and/or software. In that sense, these modules, units, and other components simply need to be hardware and/or software configured to substantially perform the specific functions described herein. Various functions of different components may be realized by any combination or subdivision of hardware and/or software, and each of the various functions may be used separately or in any combination. Further, an input/output device, an I/O device, or user interface configured as, and not limited to, a keyboard, a display, a touch screen, and a pointing device may be connected to the system directly or via an intermediate I/O controller. Thus, various aspects of the present disclosure may be realized in many different embodiments, all of which are included within the scope of the present disclosure.

REFERENCE SIGNS LIST 10 communication system
11 first electronic device
12 second electronic device
13 charging stand
14 electronic device
15 communication interface
16 power receiving unit
18 battery
18 microphone
19 speaker
20 camera
21 display
22 input interface
23 memory
24 controller
25 communication interface
26 power supply unit
27 changing mechanism
28 microphone
29 speaker
30 camera
31 motion sensor
32 mount sensor
33 memory
34 controller
Bt detail display button
Ei emotion level
Fi energy level
LA verbal ability
pEI emotion information for each interaction
pTm start time of each interaction
TI comprehensive evaluation image
Tm generated time
Tp topic

The invention claimed is:

1. An electronic device comprising:
a controller configured to perform a voice recognition operation on a voice of a person being monitored by analyzing the voice of the person being monitored in view of information stored in a memory to generate voice recognition information and a monitoring operation for generating emotion information for the person being monitored based on the voice recognition information; and
a communication interface configured to communicate with a mobile terminal, wherein
the controller is configured to send the emotion information to the mobile terminal if an owner of the electronic device is registered as the person being monitored, and to perform a predetermined notification based on the emotion information if the owner of the electronic device is registered as a guardian of the person being monitored,
the memory is configured to store user information including a user of the electronic device and monitoring information including the person being monitored, the controller is configured to determine whether the user included in the user information is the person being monitored included in the monitoring information, when the controller determines the user included in the user information is the person being monitored included in the monitoring information, the controller is configured to cause the communication interface to communicate with the mobile terminal, when the controller determines the user included in the user information is not the person being monitored included in the monitoring information, the controller is configured to:
  determine whether the owner of the electronic device is providing an instruction to the electronic device, and
  in response to the instruction from the owner of the electronic device, control the electronic device to perform the voice recognition operation and the monitoring operation instead of causing the communication interface to communicate with the mobile terminal.

2. The electronic device according to claim 1, wherein the controller is configured to cause the communication interface to transmit the emotion information to the mobile terminal.

3. The electronic device according to claim 1, wherein the controller is configured to display the emotion information on a display.

4. The electronic device according to claim 1, wherein the controller is configured to generate the emotion information based on at least one of a tone and volume, the extent to which positive words and negative words are included, the vocabulary, and a speaking speed of the voice of the person being monitored.

5. The electronic device according to claim 4, wherein the controller is further configured to accumulate at least one of the tone and volume, the extent to which positive words and negative words are included, the vocabulary, and the speaking speed, calculate a mean value of the accumulated at least one of the tone and volume, the extent to which positive and negative words are include, the vocabulary, and the speaking speed, and then generate the emotion information by comparing at least one of the tone and volume, the extent to which positive words and negative words are included, the vocabulary, and the speaking speed during the monitoring operation to the mean value.

6. The electronic device according to claim 5, wherein the controller is configured to calculate the mean value for each registered person being monitored and generate respective emotion information by comparison to the mean value.

7. The electronic device according to claim 1, wherein the controller is configured to determine whether an abnormality has occurred in respect of the person being monitored during the monitoring operation, based on ambient sound and an image of surroundings.

8. The electronic device according to claim 7, wherein the controller is configured to notify an occurrence of the abnormality to the mobile terminal when the controller determines that the abnormality has occurred in respect of the person being monitored.

9. The electronic device according to claim 7, wherein the controller is configured to report an occurrence of the abnormality when the controller determines that the abnormality has occurred in respect of the person being monitored.

10. The electronic device according to claim 2, wherein the communication interface is configured to acquire additional emotion information from an other electronic device; and
the electronic device includes a display configured to display an image based on the emotion information.

11. The electronic device according to claim 1, wherein the controller is configured to generate the emotion information based on analysis of values measured in the voice recognition operation.

12. The electronic device according to claim 1, wherein the controller is configured to determine whether the electronic device is configured to receive the monitoring information from the mobile terminal,
if the electronic device is configured to receive the monitoring information, the controller is configured to determine whether the owner of the electronic device is providing the instruction to the electronic device, and
in response to the instruction from the owner of the electronic device, the controller is configured to control the electronic device to perform the voice recognition operation and the monitoring operation instead of receiving the monitoring information.

13. A communication system comprising:
a mobile terminal; and
an electronic device that includes
a communication interface configured to communicate with the mobile terminal, and
a controller that is configured to
  perform a voice recognition operation on a voice of a person being monitored by analyzing the voice of the person being monitored in view of information stored in a memory to generate voice recognition information,
  perform a monitoring operation for generating emotion information for the person being monitored based on the voice recognition information, and
  cause the communication interface to transmit the emotion information to the mobile terminal,
wherein the mobile terminal includes a display configured to display the emotion information acquired from the electronic device,
the controller is configured to send the emotion information to the mobile terminal if an owner of the electronic device is registered as a person being monitored, and to perform a predetermined notification based on the emotion information if the owner of the electronic device is registered as a guardian of the person being monitored,
the memory is configured to store user information including a user of the electronic device and monitoring information including the person being monitored,
the controller is configured to determine whether the user included in the user information is the person being monitored included in the monitoring information,
when the controller determines the user included in the user information is the person being monitored included in the monitoring information,
  the controller is configured to cause the communication interface to communicate with the mobile terminal,
when the controller determines the user included in the user information is not the person being monitored included in the monitoring information, the controller is configured to:
  determine whether the owner of the electronic device is providing an instruction to the electronic device, and in response to the instruction from the owner of the electronic device, control the electronic device to perform the voice recognition operation and the monitoring operation instead of causing the communication interface to communicate with the mobile terminal.

14. The communication system according to claim 13, wherein the controller is configured to generate the emotion information based on analysis of values measured in the voice recognition operation.

15. The communication system according to claim 13, wherein the controller is configured to determine whether the electronic device is configured to receive the monitoring information from the mobile terminal,
if the electronic device is configured to receive the monitoring information, the controller is configured to determine whether the owner of the electronic device is providing the instruction to the electronic device, and
in response to the instruction from the owner of the electronic device, the controller is configured to control the electronic device to perform the voice recognition operation and the monitoring operation instead of receiving the monitoring information.

16. A monitoring method comprising:
performing a voice recognition operation on a voice of a person being monitored, via a controller that is a component of an electronic device, by analyzing the voice of the person being monitored in view of information stored in a memory to generate voice recognition information;
performing a monitoring operation to generate emotion information for the person being monitored based on the voice recognition information via the controller, wherein the controller is configured to send the emotion information to a mobile terminal if an owner of the electronic device is registered as a person being monitored, and to perform a predetermined notification based on the emotion information if the owner of the electronic device is registered as a guardian of the person being monitored;
storing, in the memory, user information including a user of the electronic device and monitoring information including the person being monitored;
determining, via the controller, whether the user included in the user information is the person being monitored included in the monitoring information;
when the controller determines the user included in the user information is the person being monitored included in the monitoring information:
causing, via the controller, a communication interface to communicate with the mobile terminal; and
when the controller determines the user included in the user information is not the person being monitored included in the monitoring information:
determining, via the controller, whether the owner of the electronic device is providing an instruction to the electronic device, and
in response to the instruction from the owner of the electronic device, controlling the electronic device, via the controller, to perform the voice recognition operation and the monitoring operation instead of causing the communication interface to communicate with the mobile terminal.

17. The monitoring method according to claim 16, further comprising:
generating the emotion information based on analysis of values measured in the voice recognition operation via the controller.

18. The monitoring method according to claim 16, further comprising:
determining, via the controller, whether the electronic device is configured to receive the monitoring information from the mobile terminal; and
if the electronic device is configured to receive the monitoring information,
determining, via the controller, whether the owner of the electronic device is providing the instruction to the electronic device; and
in response to the instruction from the owner of the electronic device, controlling the electronic device, via the controller, to perform the voice recognition operation and the monitoring operation instead of receiving the monitoring information.

\* \* \* \* \*